No. 612,973. Patented Oct. 25, 1898.
G. LEWIS.
SLIDE SIGNAL.
(Application filed June 18, 1898.)
(No Model.)
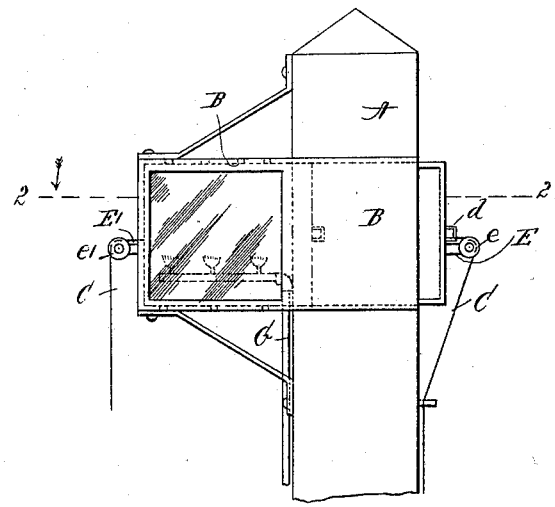
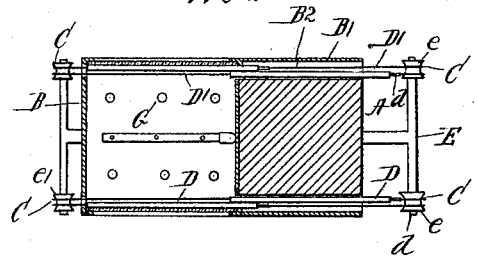
WITNESSES
John Buckler,
M. A. Knowles
INVENTOR
George Lewis,
BY
Edgar Tate & Co.
ATTORNEYS
THE NORRIS PETERS CO., PHOTO-LITHO., WASHINGTON, D. C.

UNITED STATES PATENT OFFICE.

GEORGE LEWIS, OF DENBIGH, ENGLAND.

SLIDE-SIGNAL.

SPECIFICATION forming part of Letters Patent No. 612,973, dated October 25, 1898.

Application filed June 18, 1898. Serial No. 683,890. (No model.)

*To all whom it may concern:*

Be it known that I, GEORGE LEWIS, a subject of the Queen of Great Britain, residing at Denbigh, England, have invented certain new and useful Improvements in Slide-Signals, of which the following is a full and complete specification, such as will enable those skilled in the art to which it appertains to make and use the same.

This invention relates to signals; and the object is to provide a signal apparatus which is adapted to expose signals of different colors and which may be operated from a distance.

A further object is to provide a signal apparatus which is simple in construction and certain in operation and one especially adapted for use at railroad-crossings.

The invention consists of a signal apparatus constructed substantially as hereinafter described, and defined in the claims.

The invention is fully disclosed in the following specification, of which the accompanying drawings form a part, in which the separate parts of my improvement are designated by the same letters of reference in each of the views, and in which—

Figure 1 is a side view of a signal apparatus constructed in accordance with my invention, and Fig. 2 is a cross-section thereof on the line 2 2 of Fig. 1.

Referring to the drawings, A represents a suitable supporting-post, to the upper end of which is secured a frame B. The sides of the frame B are extended transversely across the post, forming extensions B', and the post is cut away within said extensions, forming ways or guides $B^2$, which communicate with the interior of the frame B. The frame is provided with open sides, which are preferably covered with glass, so as to protect the interior from the weather.

Two or more slides D D' are arranged to slide in the guides $B^2$, so as to cover and uncover the open sides of the frame. These slides D D' are preferably formed of glass and colored in different tints suitable to the intended purpose. Each end of the slides D D' is provided with an eye $d$ or similar device for attaching an operating-cord C C', by which the slides are moved in or out of the frame. A suitable bracket E is arranged upon the back of the post A, upon which are mounted suitable guide-rollers $e$, over which the cord C is guided, and eyes or staples are provided upon the sides of the post, through which the cords C C' are guided to any suitable operating-point.

The end of the frame B is provided with lugs E', in which are mounted rollers $e'$, over which the operating-cord C' is guided.

A gas-pipe G is led into the frame A and is supplied with suitable burners for affording the necessary light, and suitable apertures are arranged in the frame A for purposes of ventilation.

It is obvious that many of the details of construction may be varied without departing from the scope of the invention, such as the substitution of suitable levers for the operating-cords and other means of illumination besides gas. So, also, the slides D D' may all be arranged upon the same side of the frame; but the construction above described is intended as a simple and effective embodiment of the invention.

Having fully described my invention, I claim as new and desire to secure by Letters Patent—

1. The herein-described signal device, comprising a suitable post or support, a frame connected with said post or support at or near the top thereof, and provided with side plates between which the post or support passes, ways or guides formed in the base or support and covered by said side plates, said ways or guides being in communication with the interior of said frame, said frame being also provided with open sides, slides mounted in said guides or ways and adapted to cover the open sides of said frame, a pulley connected with the front of said frame, other pulleys supported at the back of said post and cords or similar devices connected with each end of said slides and passed over said pulleys, substantially as shown and described.

2. The herein-described signal device, comprising a suitable post or support, a frame connected with said post or support at or near the top thereof, and provided with side plates between which the post or support passes, ways or guides formed in the post or support and covered by said side plates, said ways or guides being in communication with the interior of said frame, said frame being also provided with open sides, slides mounted in said guides or ways and adapted to cover the open sides of said frame, a pulley connected with the front of said frame, other pulleys supported at the back of said post, and cords or similar devices connected with each end of said slides and passed over said pulleys, and an illuminating device placed in said frame, substantially as shown and described.

In testimony that I claim the foregoing as my invention I have signed my name, in presence of the subscribing witnesses, this 25th day of March, 1898.

GEORGE LEWIS.

Witnesses:
J. WILSON PARRY,
JAMES GREEN.